July 28, 1953  T. REUMERMAN ET AL  2,646,747
COUNTER FOR NUMBERING AND MEASURING DEVICES
Original Filed Aug. 27, 1948

*INVENTORS*
THEODORUS REUMERMAN and
WILLIAM H.TH. HELMIG
BY Thos. A. Wilson
ATTORNEY Patented July 28, 1953

2,646,747

UNITED STATES PATENT OFFICE 2,646,747

COUNTER FOR NUMBERING AND MEASURING DEVICES

Theodorus Reumerman, Zandvoort, and Willem H. T. Helmig, Leiden, Netherlands

Original application August 27, 1948, Serial No. 46,494. Divided and this application April 19, 1951, Serial No. 221,762. In the Netherlands August 30, 1947

9 Claims. (Cl. 101—85)

This application is a division of our copending application Serial No. 46,494, filed on August 27, 1948.

The invention relates to counters for numbering and measuring devices.

In the fields of finance and commerce, serial numbers of all kinds of documents, such as bank notes, bonds, shares, lottery-tickets, orders, invoices, letters of credit, etc., have frequently to be communicated from one party to another, and to be copied for all kinds of administrative purposes. Errors in these manipulations may lead to serious consequences.

It is an object of the present invention to provide means whereby check symbols may be appended to the serial numbers of such documents, so that these numbers may be checked at any time.

Another object of the invention is to provide means whereby check symbols may be appended to the serial numbers of documents in such manner that all falsifications may be readily detected.

Still another object of the invention is to provide means for checking the operation of counters in various kinds of measuring instruments, such as gasmeters, electricity meters, telephone conversation meters, mileage indicators, and the like.

A further object of the invention is to provide counters for measuring instruments which make it possible to check at any time whether these instruments have been correctly read, and whether the readings have been correctly copied.

According to a main feature of the invention, the counter is provided with an additional checking wheel indicating a check symbol for each number indicated by the figure wheels, and with means for automatically displacing said checking wheel together with the figure wheels in such manner that any check symbol displayed by the checking wheel corresponds in a predetermined univocal manner with the remainder $R_N(S)$ obtained on dividing the number $S$ displayed by the figure wheels by a prime number $N$ greater than 10.

The exact nature of our invention, and any further objects thereof, will be apparent from the following description of some preferred embodiments, given with reference to the accompanying drawings, wherein:

Fig. 3 shows a modification of the counter shown in Figs. 1 and 2, adapted to be driven by a rotatable shaft and to be used in measuring instruments and the like.

Figure 1:
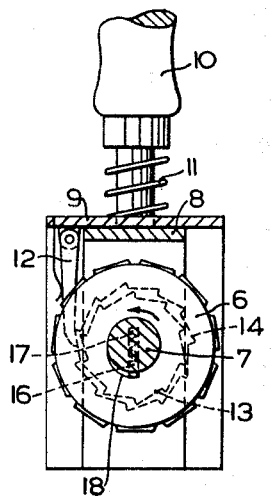
Fig. 1 is a vertical cross section of a numbering device comprising a counter according to the invention, taken along the line I—I in Fig. 2.
Figure 2:
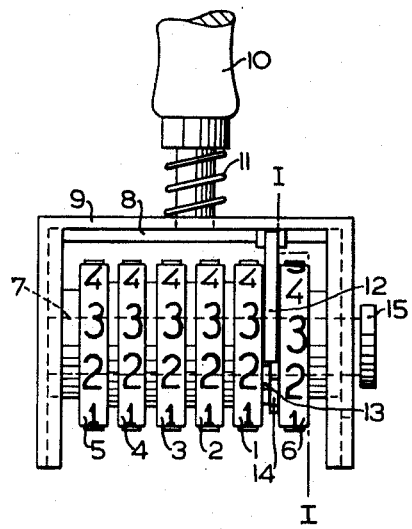
Fig. 2 is a front view of the same numbering device.

In the numbering device shown in Figs. 1 and 2, the number $N$ is equal to 11. The device comprises a plurality of figure wheels 1–5, indicating the units, tens, hundreds, thousands and tens of thousands of a serial number, respectively, and an additional checking wheel 6, bearing eleven different check symbols. In the embodiment shown in the drawing, these check symbols are the figures from 0 to 9, serving to indicate a remainder $R_N(S)$ from 0 to 9, respectively, and a dash (−) serving to indicate a remainder 10.

All the said wheels are freely rotatable about a shaft 7 suspended in a brace 8, which may be downwardly displaced with respect to the frame 9 by means of a stem 10. A spring 11 returns the brace 8 to its initial position as soon as the stem is released. At the right, the shaft 7 extends through a slot in the frame 9.

At the end of each downward movement of the stem 10, the figures appearing in the bottom positions on the figure wheels 1–5 and on the checking wheel 6 are printed on the document to which the numbering device is applied. During the return movement of the stem, the unit figure wheel 1 and the checking wheel 6 are displaced over one position by means of a pawl 12, resiliently attached to the frame 9 and engaging a pair of ratchet wheels 13, 14, the ratchet wheel 13 being integral with the unit figure wheel 1, and the ratchet wheel 14 being integral with the checking wheel 6.

The figure wheels 2–5 are displaced over one position after each complete revolution of the preceding wheel by the usual means, not shown in the drawing.

As appears from Fig. 1, the ratchet wheel 13 has ten teeth and the ratchet wheel 14 has eleven teeth. Thus, upon each upward movement of the brace 8, the unit figure wheel 1 will be displaced over $\frac{1}{10}$ of its circumference, and the checking wheel 6 over $\frac{1}{11}$ of its circumference. The diameters of the ratchet wheels 13 and 14 have been chosen in a ratio of 10:11, so that the pawl 12 may simultaneously engage a tooth of each wheel.

The unit figure wheel 1 and the checking wheel 6 are spaced at some distance with respect to each other. Thus, the check symbol will be printed at some distance from the serial number proper, so as to be easily recognisable.

The wheels 1–6 may be returned to their initial position by rotating the shaft 7 in a counterclockwise direction with the aid of the knob 15. For this purpose, pins 16 are inserted in holes provided in the shaft 7 opposite to each wheel, each pin being pressed outwards by a spring 17, whereas the wheels are each provided with a sawtooth-shaped recess 18. During the normal counterclockwise movement of the wheels, the pins 16 run along the weakly inclined sides of the recesses 18, so that the figure wheels may freely rotate around the shaft 7. However, upon rotating the shaft 7, the pins engage the steep edges of the recesses 18, and the wheels are taken along. The recesses 18 are placed in corresponding positions on each wheel, so that all wheels are simultaneously returned to their initial position.

It will be understood that the above-described device will successively print the following numbers: 00000 0, 00001 1, 00002 2, 00003 3, 00004 4, 00005 5, 00006 6, 00007 7, 00008 8, 00009 9, 00010 –, 00011 0, 00012 1, etc. The check symbol printed after each serial number indicates the remainder obtained on dividing the number by 11, the remainder 10 being indicated by the dash.

The check symbols may also be indicated by letters, so that the device prints, for instance, as follows: 00000 A, 00001 B, 00002 C, 00003 D, 00004 E, 00005 F, 00006 G, 00007 H, 00008 J, 00009 K, 00010 L, 00011 A, 00012 B, etc.

The above-described device may be used for numbering all kinds of documents or other objects which have to be consecutively numbered, and the numbers may be checked at any time by determining the check symbols, for instance by dividing the number by 11.

The inclusion of a check figure in the serial numbers of printed documents is a valuable auxiliary in discovering falsifications, as forgers who are not conversant with the checking system are almost certain to use wrong check symbols. This effect may still be improved by using a secret key for the check symbols. Such a secret key may be obtained by replacing the checking wheel of the above-described device by another wheel on which the check symbols are arranged in an arbitrary order, so that the device prints, for instance as follows: 00000 1, 00001 3, 00002 6, 00003 9, 00004 2, 00005 4, 00006 7, 00007 –, 00008 5, 00009 8, 00010 0, 00011 1, 00012 3, etc. The key may be changed after each 100 numbers, for instance, so that it will be practically impossible for any forger to find out the right check symbols. The tracing of forged bank notes, admission tickets, and the like may be greatly facilitated by this measure. Of course, authorized persons must be supplied with the key, or with a checking list indicating the right check symbols.

It is to be noted that a faulty operation of the numbering device may also be discovered with the aid of the check symbol. Occasionally, two adjoining figure wheels of a counter are displaced at the same time, so that the serial number is shifted for instance by 101, instead of 1. This may be due, for instance to dried up printing ink adhering to the figure wheels. Up to now, the complete series of printed documents had to be inspected in order to find this error. However, if a check symbol is appended to each serial number, the faulty operation will immediately be discovered, since the check symbol will no longer correspond with the remainder obtained on the dividing number by 11. Of course, if the check symbols should only be used to check the operation of the numbering device, the printing of the check symbols might be omitted.

In applying the invention to measuring instruments, the counters of these instruments are provided with an additional checking wheel having eleven positions, similar to the checking wheel of the device shown in Figs. 1 and 2. If the counter is actuated step by step, such as in telephone conversation meters, the check figure wheel may be driven by the same pawl that drives the unit figure wheel of the counter, as shown in Figs. 1 and 2. However, if the counter is actuated by rotation, as in the case of gas and electricity meters, a modification of the device of Figs. 1 and 2 will have to be used, wherein the check symbol wheel is driven by a special toothed wheel. Such a modification is shown in Fig. 3.

Figure 3:
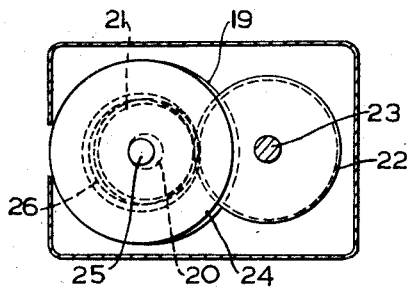

Referring to Fig. 3, the counter comprises a plurality of figure wheels, only the unit figure wheel 19 being shown in the drawing. The wheel 19 is rotatable around a shaft 20, and is integral with a toothed wheel 21, engaging a toothed wheel 22 fixedly attached to the driving shaft 23 of the counter. Thus, the unit figure wheel 19 is driven by the shaft 23, and it takes along the remaining figure wheels, indicating the tens, hundreds, thousands, etc. in the usual manner.

A checking wheel 24 is mounted on a shaft 25 laterally displaced over some distance with respect to shaft 20, and is integral with a toothed wheel 26 also engaging the toothed wheel 22. The diameters of toothed wheels 21 and 26 have been chosen in a ratio of 10:11, so that the unit figure wheel 19 perform eleven revolutions as against ten revolutions of the checking wheel 24. The ratio of the diameters of wheels 19 and 24 has been so chosen that the front parts of both wheels, shown at the left in the drawing, are lying in the same plane.

The operation of the device is similar to that of the device shown in Figs. 1 and 2. The check symbol wheel 24 indicates the check symbol of the number appearing on the figure wheels, and this check symbol may be read and noted down upon reading the meter, so that a faulty reading, or an error in copying out the reading for any administrative purposes may always be detected. At the same time, a faulty operation of the counter will immediately be discovered with the aid of the check symbol. For instance, if one of the figure wheels slips, or if it is taken along at the wrong moment, the check symbol will no longer correspond with the reading, and this anomaly provides an indication that the counter requires to be overhauled.

By means of the above-described devices, the checking of all kinds of numbers is made possible by appending a check symbol corresponding with the remainder obtained upon dividing by 11. It is to be noted that the same checking possibilities may be obtained by indicating the remainder obtained in dividing by any other prime number above 10, such as 13, 17, 19, or 23. For instance, the remainder upon dividing by 23 could be indicated by using a checking wheel bearing 23 different letters of the alphabet, and being displaced over 1/23 of its circumference after each displacement of the units figure wheel.

Although the invention has been explained hereinbefore with reference to some specific embodiments thereof, it is to be understood that many modifications and adaptations of these embodiments are possible within the scope of the invention, as set forth in the appended claims.

We claim:

1. A counter for numbering and measuring devices, comprising a unit figure wheel having ten positions, a plurality of other figure wheels each having ten positions, a checking wheel having N positions, N being a prime number greater than 10, means for displacing each of the said other figure wheels over one position after each complete revolution of the preceding figure wheel, and means for simultaneously driving said unit figure wheel and said checking wheel in such manner that said checking wheel is displaced over one position for each displacement of said unit figure wheel over one position.

2. A counter as claimed in claim 1, further comprising a ratchet wheel having ten teeth and integral with said unit figure wheel, a second ratchet wheel having N teeth and integral with said checking wheel, a pawl simultaneously engaging both the said ratchet wheels, and means for moving said pawl in such manner that both said unit figure wheel and said checking wheel are displaced over one position for each movement of said pawl.

3. A counter as claimed in claim 2, wherein the diameters of said first-mentioned and said second ratchet wheel have a ratio of 10:N.

4. In a measuring instrument, a counter comprising a unit figure wheel having ten positions, a plurality of other figure wheels each having ten positions, an additional checking wheel having N positions, N being a prime number greater than 10, means for displacing each of the said other figure wheels over one position after each complete revolution of the preceding figure wheel, driving means for continuously moving said unit figure wheel, driving means for continuously moving said checking wheel, and coupling means between the said first-mentioned and the said second-mentioned driving means causing said checking wheel to be displaced over one position for each displacement of said unit figure wheel over one position.

5. The combination as claimed in claim 4, wherein the said coupling means comprise a gearing coupling said checking wheel with said unit figure wheel.

6. In a numbering device for printing consecutive serial numbers on documents, a counter comprising a unit figure wheel having ten positions, a plurality of other figure wheels each having ten positions, an additional checking wheel having N positions, N being a prime number greater than 10, bearing N different check symbols and arranged in such a position that a check symbol is printed together with each number printed by the said figure wheels means for displacing each of the said other figure wheels over one position after each complete revolution of the preceding figure wheel, means for displacing said unit figure wheel over one position after each printing, and means for displacing said checking wheel over one position after each printing.

7. The combination as claimed in claim 6, wherein the check symbols arranged on said checking wheel are interchangeable.

8. A numbering device for printing consecutive serial numbers comprising a unit figure wheel having ten positions, a plurality of other figure wheels each having ten positions, an additional checking wheel having N positions, N being a prime number greater than 10, means for displacing each of the said other figure wheels over one position after each complete revolution of the preceding figure wheel, a ratchet wheel having ten teeth and integral with said unit figure wheel, a second ratchet wheel having N teeth and integral with said checking wheel, and a common pawl engaging both the said ratchet wheels during the return movement of the said figure wheels after each printing, whereby the said unit figure wheel and the said checking wheel are each displaced over one position.

9. A counter for measuring instruments, comprising a unit figure wheel having ten positions, a plurality of other figure wheels each having ten positions, an additional checking wheel having N positions, N being a prime number greater than 10, means for displacing each of the said other figure wheels over one position after each complete revolution of the preceding figure wheel, a toothed wheel integral with said unit figure wheel, a second toothed wheel integral with said checking wheel and having a diameter equal to $N/10$ times that of said first-mentioned toothed wheel, a driving shaft, and a third toothed wheel mounted on said driving shaft and engaging both said first-mentioned and said second toothed wheel.

THEODORUS REUMERMAN.
WILLEM H. TH. HELMIG.

References Cited in the file of this patent

UNITED STATES PATENTS

| Number | Name | Date |
| --- | --- | --- |
| 425,580 | Reinhardt | Apr. 15, 1890 |
| 425,581 | Reinhardt | Apr. 15, 1890 |